US006972875B2

(12) United States Patent
Brewster (10) Patent No.: US 6,972,875 B2
(45) Date of Patent: Dec. 6, 2005

(54) DOCUMENT DELIVERY SYSTEM FOR AUTOMATICALLY SUSPENDING DELIVERY OF AN ELECTRONIC DOCUMENT

(75) Inventor: Jon A. Brewster, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 854 days.

(21) Appl. No.: 09/917,014

(22) Filed: Jul. 26, 2001

(65) Prior Publication Data

US 2002/0018241 A1 Feb. 14, 2002

Related U.S. Application Data

(63) Continuation-in-part of application No. 09/325,040, filed on Jun. 7, 1999.

(51) Int. Cl.[7] .............................................. H04N 1/00
(52) U.S. Cl. ..................... 358/402; 358/404; 358/1.15
(58) Field of Search ................................ 358/402, 403, 358/407, 1.15, 1.16; 379/100.09, 100.08, 379/100.07, 100.01

(56) References Cited

U.S. PATENT DOCUMENTS

| | | | | |
|---|---|---|---|---|
| 5,539,523 A | * | 7/1996 | Nakai et al. ................. | 358/296 |
| 5,721,827 A | * | 2/1998 | Logan et al. ............... | 709/217 |
| 5,793,497 A | * | 8/1998 | Funk ........................... | 358/402 |
| 5,850,520 A | * | 12/1998 | Griebenow et al. ......... | 709/206 |
| 5,970,231 A | * | 10/1999 | Crandall ..................... | 709/238 |
| 6,012,071 A | * | 1/2000 | Krishna et al. ............. | 715/522 |
| 6,157,924 A | * | 12/2000 | Austin ......................... | 707/10 |
| 6,178,424 B1 | * | 1/2001 | Okumura et al. ............ | 707/10 |
| 6,182,078 B1 | * | 1/2001 | Whitmyer, Jr. .............. | 707/10 |
| 6,438,588 B1 | * | 8/2002 | Crandall ..................... | 709/217 |
| 6,718,369 B1 | * | 4/2004 | Dutta .......................... | 709/206 |
| 2002/0035697 A1 | * | 3/2002 | McCurdy et al. ........... | 713/200 |
| 2002/0154157 A1 | * | 10/2002 | Sherr et al. ................. | 345/716 |

OTHER PUBLICATIONS

Pannon GSM [available online: http://www.pannongsm.hu/index_en.html] Mar. 19, 2001.
Pannon GISMO—Pannon GISMO—Services [available online: http//www.pannongsm.hu/kinalat/szolgaltatsok/trans_en.html] Mar. 19, 2001.
Pannon GSM—Pannon GSM—Services [available online: http//www.pannongsm.hu/kinalat/szolgaltatsok/reconn_en.html] Mar. 19, 2001.
Newsobserver.com : circulation [available online: http://www.news-observer.com/circulation/holiday.html] Mar. 19, 2001.

* cited by examiner

*Primary Examiner*—Kimberly Williams
*Assistant Examiner*—Negussie Worku (57) ABSTRACT

The present invention provides a method and apparatus for suspending delivery of electronic documents, that is, stopping and restarting electronic delivery of documents according to a user's preset schedule. The method may include the steps of entering a delivery schedule for the document into an electronic receiving device, and automatically suspending, without user intervention, delivery of the document based on the delivery schedule, then automatically restarting delivery at the time indicated by the user. In an electronic document delivery system, the apparatus for automatically suspending delivery of a document may include a scheduling unit and a suspension control unit. The scheduling unit is used to enter a delivery schedule for the electronic document into an electronic receiving device. The suspension control unit is coupled to the scheduling unit and automatically suspends and then restarts the delivery of the electronic document, without user intervention, based on the delivery schedule that is adjusted in accordance with a predetermined suspension scheme.

44 Claims, 5 Drawing Sheets

DOCUMENT DELIVERY SYSTEM FOR AUTOMATICALLY SUSPENDING DELIVERY OF AN ELECTRONIC DOCUMENT

RELATED INVENTIONS

The present invention is a continuation-in-part of U.S. patent application Ser. No. 09/325,040 filed on behalf of Jon A. Brewster et al. on Jun. 7, 1999 and assigned to the assignee of the present invention.

FIELD OF THE INVENTION

This invention relates to the delivery of electronic documents. More particularly, the present invention relates to a document delivery system for automatically suspending delivery of an electronic device for a predetermined period of time.

BACKGROUND OF THE INVENTION

In the mid 1400's, Johann Gutenberg revolutionized how information is disseminated through his invention of the movable type press. With the publication of the Mazarin Bible, documents which were once held in the exclusive domain of a chosen few were now widely available to the masses. Nearly 550 years later, the mass media revolution that Gutenberg started is alive and well, complete with newspapers such as the New York Times and the Washington Post, magazines such as Newsweek and Sports Illustrated, and literally thousands upon thousands of other lesser known publications.

While these thousands of publications cover a wide range of interests, from news to sports to fashion to model rocketry, they have one thing in common: they are intended to be read by a mass market. Unlike the pre Gutenberg days, where a document would literally be read by only one person or a very small number of people, it is not economically viable for today's publications to have such a small readership, due at least in part to high marketing, production and distribution costs. In fact, many of today's publications are funded to a very large extent by the advertising contained within them. These advertisers are attracted to publications that can consistently deliver a large, reliable audience of consumers that will be exposed to their advertising.

While this mass market publication model has worked well for hundreds of years, it is not without its problems. One such problem is that a typical reader of a publication has a wide variety of interests, and no single mass market publication will be able to satisfy all these interests. For example, a reader who is interested in international news, golf, fly fishing, Genealogy, and computers may have to subscribe to several different publications to satisfy these interests. Of course, since these publications are intended for a mass market, they will also contain a significant amount of material that our reader is not interested in and will not read. It goes without saying that if there is a significant amount of material a reader isn't reading, there is a significant amount of advertising the reader isn't reading either—as well as a significant amount of paper that is wasted. Advertisers know this, and agree to pay considerably less to a mass market magazine or newspaper per 1000 exposures to their ad than they would pay to a direct-mail generator that can provide a more specific guarantee that the people exposed to their ad are of a demographic group that will be much more likely to read their ad and be interested in it.

In addition, it is neither cost-effective nor time effective for most readers to subscribe to and/or read a large number of publications. Generally, the typical reader will only subscribe to a few publications that are of the most interest to them. The reduced readership level of the publications our typical reader chooses not to subscribe to, even though he would be interested in at least some of the editorial and advertising content contained inside, means that the publication receives less subscription and advertising revenue than they otherwise would. If many other readers make the same decision, the continued health of the publication may be in jeopardy, and the publication may be forced to go out of business. In fact, many publications do go out of business yearly for failing to attract a sustaining number of advertisers and readers—even if there are a large number of readers that would be interested in reading their publication, and a corresponding number of advertisers anxious to have these readers exposed to their ads. In general, publications that fail to attract a substantial mass market of people willing to pay for and/or read them cease publication. This is a shame, since many of these publications would enrich the diversity of information available to all readers, and would provide an avenue for lesser known writers and artists to practice their wares.

In more recent years, a new type of publication has emerged: the electronic publication. Readers of these publications typically sign onto the Internet through their computer, and read the publications online. Some of these publications, such as CNN.com and pointcast.com, allow users to state personal preferences on what type of material they want to read. Often, these personalized electronic publications include advertising, usually in the form of a banner ad that is placed on the top of the screen.

While these electronic publications have been an interesting development in the distribution of information, they still represent a tiny fraction of the information that is published under the more traditional post-Gutenberg model. Many readers of these electronic publications complain that they are very difficult to read, especially for long periods of time. While it might be convenient for a reader to sign onto the Internet to look at the CNN.com web site for a brief summary of late breaking news, this reader would most likely only spend a few minutes at the site, and would likely still subscribe to the more traditional print media such as Newsweek or the Washington Post. They would also likely spend significantly more time reading the more traditional printed publication than they would spend reading the electronic publication, and correspondingly, spend more time being exposed to the ads in the traditional printed publication. Accordingly, printed publications continue to flourish today—more than five centuries after Gutenberg made them possible. A significant problem with sending documents electronically is that, when a reader is away from the location where he receives the electronic documents, such documents may accumulate and may ultimately simply take up an inordinate amount of space in the memory of the receiving party's computer. In addition, the receiving party may not wish to receive the electronic deliveries in his absence. Since electronic communications are being implemented with greater and greater frequency, it is likely that, when a person is away from his computer for an extended period, he may receive a large number of electronic documents and may possibly trigger a protection mechanism in his memory storage that automatically starts eliminating the oldest documents when a predetermined amount of memory is filled, making space to store the newer documents. Alternatively, his system may not have such a protective mechanism, and when the memory is filled, the system may be unable to store more documents, causing the system to fail or the latest documents to be lost because there is no memory space in which to save them.

While these electronic deliveries have certainly benefited modern society, no significant attempt has been made thus far to solve the underlying problems with these electronic deliveries discussed above.

SUMMARY OF THE INVENTION

The present invention provides a method of suspending delivery of an electronic document for an electronic document delivery system. A delivery schedule is entered for the electronic document into an electronic receiving device. Without user intervention, delivery of the electronic document is automatically suspended based on the delivery schedule.

DETAILED DESCRIPTION OF THE EMBODIMENTS

Figure 1:
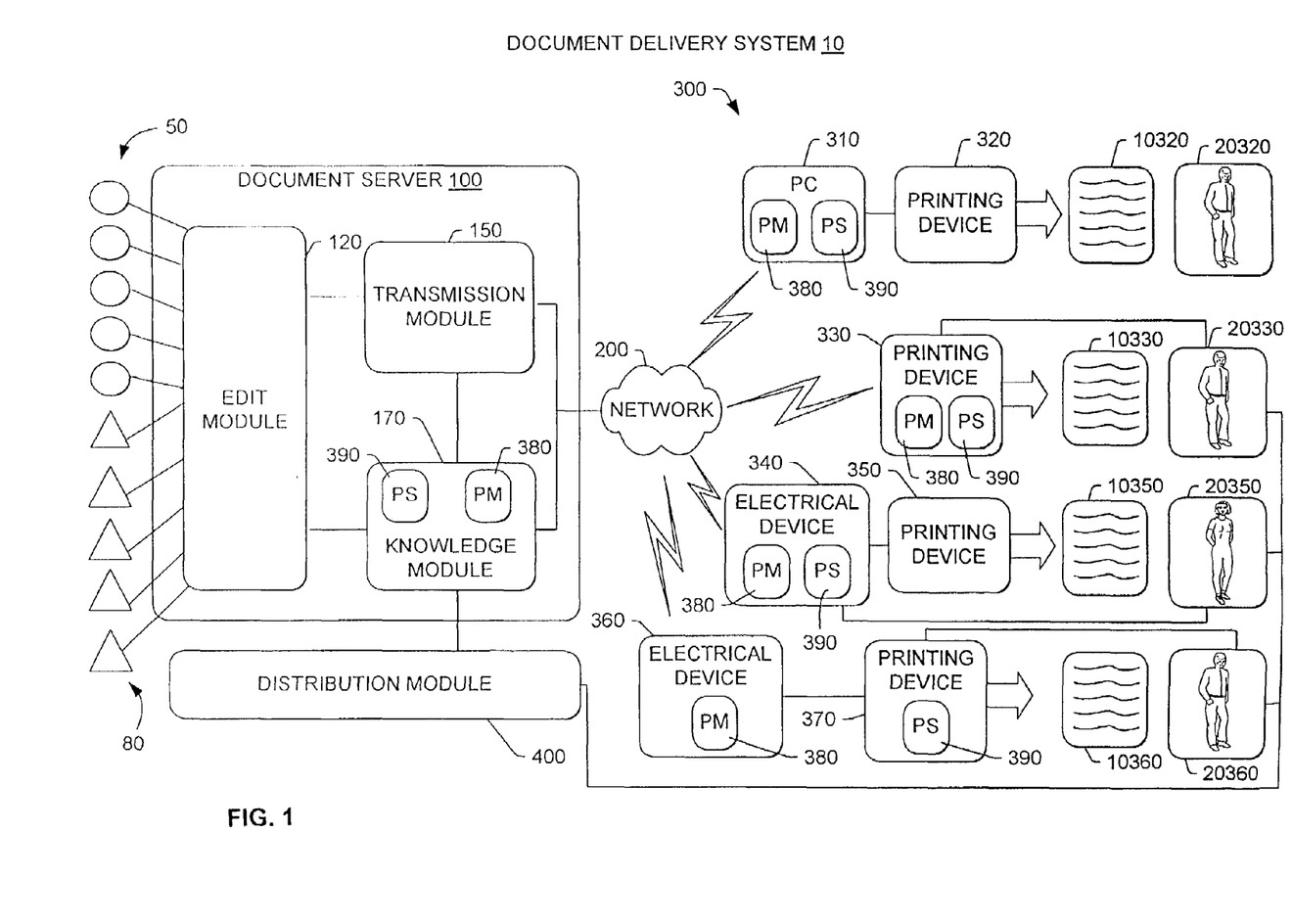
FIG. 1 shows a block diagram of a document delivery system of one embodiment of the invention.

FIG. 1 shows a block diagram of a document delivery system of one embodiment of a system that may be utilized by the invention. Document delivery system 10 contains document server 100. In one embodiment, document server 100 is operatively coupled via network 200 to a variety of personal computers, printing devices, and other electronic devices, collectively referred to as devices 300. Document server 100 contains edit module 120, transmission module 150, and knowledge module 170. Edit module 120 receives inputs from one or more content providers 50, and/or one or more advertising providers 80. Distribution module 400 is operatively coupled to document server 100. In the preferred embodiment, document server 100 is a minicomputer/server, such as an HP 9000 server sold by the Hewlett-Packard Company, although those skilled in the art will appreciate that document server 100 could be any type of other computing or electronic device(s) that performs the functions described herein and still fall within the spirit and scope of the invention.

Network 200 is preferably the Internet, although an Intranet, local area network, or other type of public or private network, either wired (e.g., telephone, cable TV, etc) or wireless (e.g., satellite, radio, cell phone, etc), could also or additionally be used.

Devices 300 are shown in FIG. 1 as being capable of being configured in a wide variety of ways. For example, personal computer 310 is shown connected to printing device 320, which prints document 10320 for user 20320. Personal computer 310 is operatively coupled to network 200. In contrast, printing device 330, which prints document 10330 for user 20330, is operatively coupled to network 200 without an intervening personal computer or other electronic device. Printing device 350, which prints document 10350 for user 20350, is shown connected to electronic device 340, which could be a set top box, television set, palmtop PDA or other type of electronic device that is operatively coupled to network 200. Finally, printing device 370, which prints document 10370 for user 20370, is connected to electronic device 360, which is operatively connected to network 200. The printing devices shown in FIG. 1 could be printers, such as the HP DeskJet 890 printer, HP LaserJet V printer, or other models of printers manufactured by HP or others; so-called "mopiers" or other multifunction printing devices that can print, fax, scan, and/or copy, or any other device capable of transferring information to a printable media such as plain paper, specialty paper, transparencies, or other media capable of tangibly receiving such information and which can be easily carried about by the user.

Figure 2:
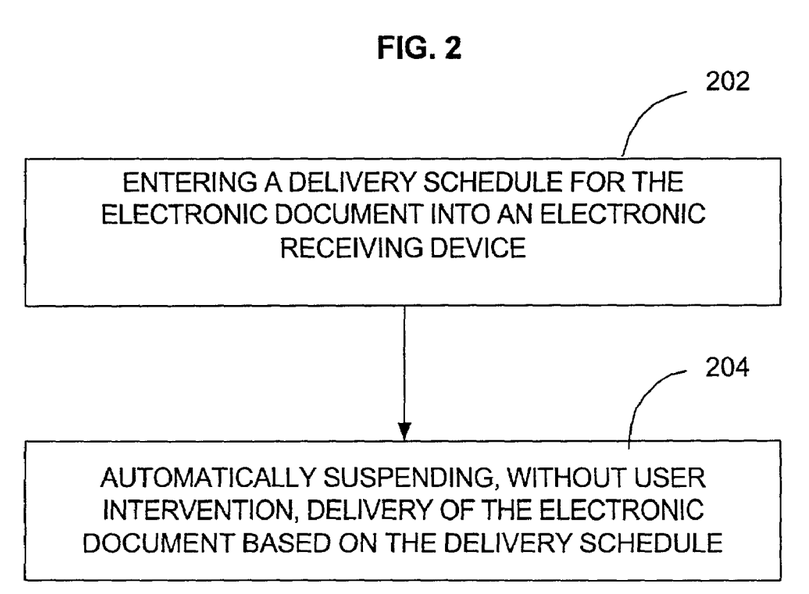
FIG. 2 is a flowchart showing the steps of one embodiment of a method in accordance with the present invention.

FIG. 2 is a flowchart showing the steps of one embodiment of a method in accordance with the present invention. In an electronic document delivery system, in the embodiment of the method of the present invention for suspending delivery of an electronic document shown in FIG. 2, the method includes the steps of entering 202 a delivery schedule for the electronic document into an electronic receiving device, and then automatically suspending 204, without user intervention, delivery of the electronic document based on the delivery schedule. Entering the delivery schedule may includes storing a delivery suspension period for the electronic document. Where the electronic document is a recurring time basis publication, entering a delivery schedule may include replacing the electronic document by a later delivered electronic document for the recurring time basis publication each time a new publication of the electronic document arrives so that a latest available publication of the electronic document is stored. Also, entering a delivery schedule may include entering an instruction to suspend delivery indefinitely until reestablishment of delivery by a request by a user. In this manner, the user may choose to essentially delete an electronic subscription and restart it when he returns from, for example, a trip.

Entering the delivery schedule may also include entering an entire delivery list for delivery suspension, thus facilitating stopping electronic deliveries in a user's absence. Typically, the delivery schedule includes delivery of a plurality of electronically published documents, and may also, where selected, include delivery of electronic mail.

Generally, the electronic document delivery system controls delivery of electronic documents to a user's computer so that, similarly to stopping delivery of a physically delivered newspaper while a user is away, delivery of electronic documents may be managed. However, the electronic document delivery system of the present invention may also be used to control delivery of electronic documents to a user's handheld device. Where desired, the delivery schedule may be modifiable remotely by a user.

Where the user is concerned about the amount of memory that may be used to store received electronic documents while he is away, the delivery schedule may be set to allow delivery of electronic documents that require less than a specified memory allocation size and to suspend delivery of electronic documents that require greater than or equal storage space compared to the specified memory allocation size.

Figure 3:
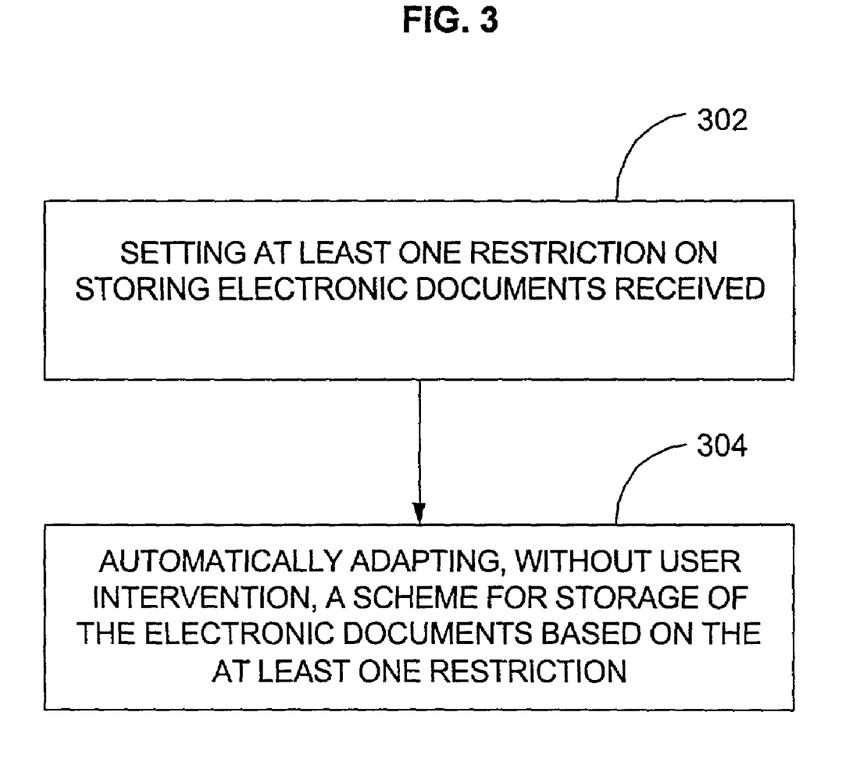
FIG. 3 is a flowchart showing the steps of another embodiment of a method in accordance with the present invention.

FIG. 3 is a flowchart showing the steps of another embodiment of a method in accordance with the present invention. In this embodiment, the method controls storage of electronic documents received by utilizing the steps of setting 302 at least one restriction on storing electronic documents received, and then automatically adapting 304, without user intervention, a scheme for storage of the electronic documents based on the at least one restriction. Setting at least one restriction may include storing a suspension period during which electronic documents that are received are not stored. Additionally, where a received electronic document is a recurring time basis publication, setting at least one restriction may include replacing, in memory, a previous publication of the received electronic document by the received electronic document each time a new publication of a received electronic document arrives so that a latest available publication of the electronic document is stored.

Setting at least one restriction on storing electronic documents received may include entering an instruction to suspend delivery indefinitely until re-establishment of delivery by a request by a user, entering an entire delivery list for delivery suspension, regulating storage of at least one electronically published document that is received, regulating storage of at least one category of electronic mail that is received, or the like.

Generally, the present invention provides an electronic document delivery system that controls delivery of a plurality of electronic documents to a user's computer, or may, where desired, control delivery of electronic documents to a user's handheld device. Setting the restriction may be accomplished remotely by a user, if desired.

Where memory use is an issue, setting at least one restriction on storing electronic documents received may include allowing delivery of electronic documents that require less than a specified memory allocation size and suspending delivery of electronic documents that require greater than or equal storage compared with the specified memory allocation size.

As shown in FIG. 2, a printing module 380 for a personal computer (PC) 310, a printing device 330 or an electrical device 340, 360 may monitor a printing schedule 390 for a printing device 320. Typically, the printing module 380 may include an apparatus 401, 501 in accordance with the present invention. Alternatively, the apparatus 400, 500 may be located in the printing module 380 of the printing document server 100, and the user may adjust electronic document suspension from his personal computer 310, printing device 330, or electrical device 340, 360.

Figure 4:
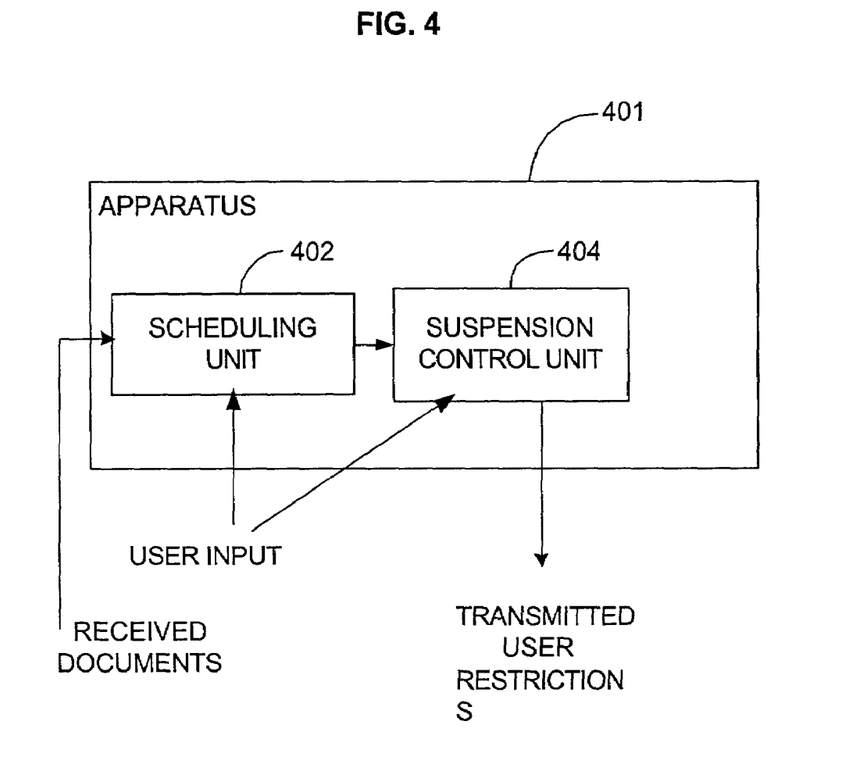
FIG. 4 is a block diagram of one embodiment of an apparatus in accordance with the present invention.

As shown in the block diagram of FIG. 4, an apparatus 401 in accordance with the present invention that automatically suspends delivery of an electronic document may include a scheduling unit 402 and a suspension control unit 404. The scheduling unit 402 is used for entering a delivery schedule for the electronic document into an electronic receiving device. The suspension control unit 404 is coupled to the scheduling unit 402, and may be utilized for automatically suspending, without user intervention, delivery of the electronic document based on the delivery schedule in accordance with a predetermined suspension scheme. That is, the delivery schedule may be modified in accordance with the predetermined suspension scheme input by the user so that delivery of electronic publications is adjusted, for example, to fit a user's latest schedule. For example, a delivery suspension period for the electronic document may be entered, or where desired, the predetermined suspension scheme may provides for, where the document is a recurring time basis publication, replacing the document by a later delivered document for the recurring time basis publication each time a new publication of the document arrives so that a latest available publication of the document is stored.

The predetermined suspension scheme may also suspend delivery indefinitely until re-establishment of delivery when a request is made by a user. Generally, the predetermined suspension scheme includes suspension of delivery of at least one electronically published document. For even greater convenience, the predetermined suspension scheme may include suspension of an entire delivery list of electronic publications. The apparatus of claim 23, wherein the predetermined suspension scheme includes suspension of delivery of electronic mail.

The predetermined suspension scheme may be used to control delivery of electronic documents to a user's computer, to a user's handheld device, or the like. Also, where desired, the predetermined suspension scheme may be entered or altered remotely by the user.

Where desired, the predetermined suspension scheme may be set to allow delivery of electronic documents that require less than a specified memory allocation size and to suspend delivery of electronic documents that require greater than or equal storage space compared to the specified memory allocation size (memory not shown).

Figure 5:
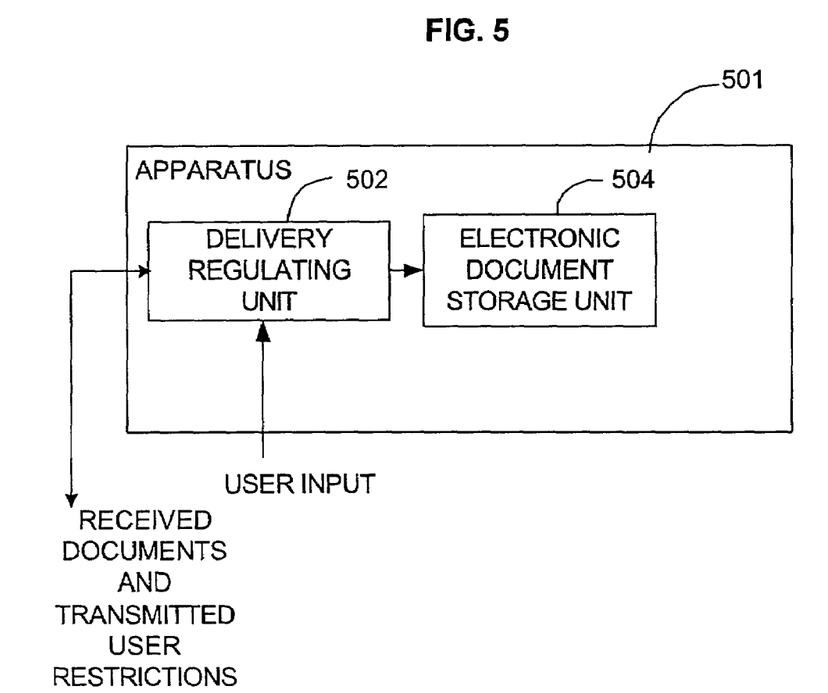
FIG. 5 is a block diagram of another embodiment of an apparatus in accordance with the present invention.

FIG. 5 is a block diagram of another embodiment of an apparatus 501 in an electronic delivery system in accordance with the present invention. The apparatus 501 controls storage of electronic documents received. Typically, the apparatus 501 includes a delivery regulating unit 502 and an electronic document storage unit 504. The delivery regulating unit 502 is used for setting at least one restriction on storing electronic documents received. The electronic document storage unit 504 is coupled to the delivery regulating unit 502. The electronic document storage unit 504 is used for automatically storing, without user intervention, the electronic documents received in accordance with the at least one restriction. Generally, the at least one restriction provides for utilizing a suspension period during which electronic documents that are received are not stored. Hence, when a user plans to be absent for a period of time, he may enter a suspension period for an electronic document so that the memory (not shown) of his personal computer 310, printing device 340, or electrical device 340, 360 does not fill up while he is away.

Alternatively, where a received electronic document is a recurring time basis publication, the user may choose to enter a restriction that provides for replacing, in memory, by previous publication of the received electronic document by the received electronic document each time a new publication of a received electronic document arrives so that a latest available publication of the electronic document is stored. If a general suspension of storage of an electronic document is desired instead, the restriction may suspend delivery indefinitely until re-establishment of delivery by a request by a user.

For greater convenience, the restriction may simply suspend an entire delivery list. However, generally the at least one restriction on storing electronic documents received includes storage regulation of at least one electronically published document that is received. Similarly, the user may regulate storage of at least one category of electronic mail that is received.

Generally, the electronic receiving device is a user's computer, the user's handheld device or the like. For convenience, the restriction may allow remote entry or modification by a user. For example, if the user decides to extend his vacation for a week, he may remotely adjust suspension of selected electronic documents for an extra week. For more control of memory user, the at least one restriction on storing electronic documents received includes allowing delivery of electronic documents that require less than a specified memory allocation size and suspending delivery of electronic documents that require greater than or equal storage compared with the specified memory allocation size.

Thus, a method and apparatus has been described for providing user-selected restrictions that permit controlled suspension of receipt of electronic documents according to the present invention.

What is claimed is:

1. A method of suspending delivery of an electronic document, for an electronic document delivery system comprising the steps of:
    entering a delivery schedule for the electronic document into an electronic receiving device;
    automatically suspending, without user intervention, delivery of the electronic document based on the delivery schedule; and
    entering a delivery suspension scheme that replaces the electronic document, if the electronic document is a recurring time basis publication, by a later delivered electronic document each time a new publication of the electronic document arrives so that a latest available publication of the electronic document is stored.

2. The method of claim 1, wherein entering the delivery schedule includes storing a delivery suspension period for the electronic document.

3. The method of claim 1, wherein entering the delivery schedule includes remotely modifying the delivery suspension scheme with a handheld device.

4. The method of claim 1, wherein entering the delivery schedule includes entering an instruction to suspend delivery indefinitely until reestablishment of delivery by a request by a user.

5. The method of claim 1, wherein entering the delivery schedule includes entering an entire delivery list for delivery suspension.

6. The method of claim 1, wherein the delivery schedule includes delivery of a plurality of electronically published documents.

7. The method of claim 1, wherein the delivery schedule includes delivery of electronic mail.

8. The method of claim 1, wherein the electronic document delivery system controls delivery of electronic documents to a user's computer.

9. The method of claim 1, wherein the electronic document delivery system controls delivery of electronic documents to a user's handheld device.

10. The method of claim 1, wherein the delivery schedule is modifiable remotely by a user.

11. The method of claim 1, wherein the delivery schedule is set to allow delivery of electronic documents that require less than a specified memory allocation size and to suspend delivery of electronic documents that require greater than or equal storage space compared to the specified memory allocation size.

12. A method of controlling storage of electronic documents received for an electronic document delivery system, comprising the steps of:
    selling at least one restriction on storing electronic documents received;
    automatically adapting, without user intervention, a scheme for storage of the electronic documents based on the at least one restriction; and
    entering a delivery suspension scheme that replaces an electronic document, if the electronic document is a recurring time basis publication, by a later delivered electronic document each time a new publication of the electronic document arrives so that a latest available publication of the electronic document is stored.

13. The method of claim 12, wherein setting at least one restriction includes storing a suspension period during which electronic documents that are received are not stored.

14. The method of claim 12, wherein the delivery suspension scheme is remotely modified on a handheld device.

15. The method of claim 12, wherein setting at least one restriction on storing electronic documents received includes entering an instruction to suspend delivery indefinitely until re-establishment of delivery by a request by a user.

16. The method of claim 12, wherein setting at least one restriction on storing electronic documents received includes entering an entire delivery list for delivery suspension.

17. The method of claim 12, wherein setting at least one restriction on storing electronic documents received includes regulating storage of at least one electronically published document that is received.

18. The method of claim 12, wherein setting at least one restriction on storing electronic documents received includes regulating storage of at least one category of electronic mail that is received.

19. The method of claim 12, wherein the electronic document delivery system controls delivery of a plurality of electronic documents to a user's computer.

20. The method of claim 12, wherein the electronic document delivery system controls delivery of electronic documents to a user's handheld device.

21. The method of claim 12, wherein setting at least one restriction on storing electronic documents received includes is accomplished remotely by a user.

22. The method of claim 12, wherein setting at least one restriction on storing electronic documents received includes allowing delivery of electronic documents that require less than a specified memory allocation size and suspending delivery of electronic documents that require greater than or equal storage compared with the specified memory allocation size.

23. An apparatus for an electronic document delivery system that automatically suspends delivery of an electronic document, comprising:
    a scheduling unit, for entering a delivery schedule for the electronic document into an electronic receiving device;
    a suspension control unit, coupled to the scheduling unit, for automatically suspending, without user intervention, delivery of the electronic document based on the delivery schedule in accordance with a predetermined suspension scheme; and
    a delivery suspension unit that replaces the electronic document, if the electronic document is a recurring time basis publication, by a later delivered electronic document each time a new publication of the electronic document arrives so that a latest available publication of the electronic document is stored.

24. The apparatus of claim 23, wherein the suspension control unit stores a delivery suspension period for the document.

25. The apparatus of claim 23, wherein the predetermined suspension unit is modifiable by a remote handheld device.

26. The apparatus of claim 23, wherein the predetermined suspension scheme provides for suspending delivery indefinitely until re-establishment of delivery when a request is made by a user.

27. The apparatus of claim 23, wherein the predetermined suspension scheme includes entry of an entire delivery list for delivery suspension.

28. The apparatus of claim 23, wherein the predetermined suspension scheme includes suspension of delivery of at least one electronically published document.

29. The apparatus of claim 23, wherein the predetermined suspension scheme includes suspension of delivery of electronic mail.

30. The apparatus of claim 23, wherein the predetermined suspension scheme controls delivery of electronic documents to a user's computer.

31. The apparatus of claim 23, wherein the predetermined suspension scheme controls delivery of electronic documents to a user's handheld device.

32. The apparatus of claim 23, wherein the predetermined suspension scheme is modifiable remotely by a user.

33. The apparatus of claim 23, wherein the predetermined suspension scheme is set to allow delivery of electronic documents that require less than a specified memory allocation size and to suspend delivery of electronic documents that require greater than or equal storage space compared to the specified memory allocation size.

34. An apparatus for an electronic document delivery system that controls storage of electronic documents received, comprising:
   a delivery regulating unit that sets at least one restriction on storing electronic documents received;
   an electronic document storage unit, coupled to the delivery regulating unit, that automatically stores, without user intervention, the electronic documents received in accordance with the at least one restriction; and
   a delivery suspension unit that replaces an electronic document, if the electronic document is a recurring time basis publication, by a later delivered electronic document each time a new publication of the electronic document arrives so that a latest available publication of the electronic document is stored.

35. The apparatus of claim 34, wherein the at least one restriction provides for utilizing a suspension period during which electronic documents that are received are not stored.

36. The apparatus of claim 34, wherein the delivery suspension unit is remotely modifiable by a handheld device.

37. The apparatus of claim 34, wherein the at least one restriction on storing electronic documents received includes an instruction to suspend delivery indefinitely until re-establishment of delivery by a request by a user.

38. The apparatus of claim 34, wherein the at least one restriction on storing electronic documents received includes suspension for an entire delivery list.

39. The apparatus of claim 34, wherein the at least one restriction on storing electronic documents received includes storage regulation of at least one electronically published document that is received.

40. The apparatus of claim 34, wherein the at least one restriction on storing electronic documents received includes regulating storage of at least one category of electronic mail that is received.

41. The apparatus of claim 34, wherein the electronic receiving device is a user's computer.

42. The apparatus of claim 34, wherein the electronic receiving device is a user's handheld device.

43. The apparatus of claim 34, wherein the at least one restriction on storing electronic documents received is entered remotely by a user.

44. The apparatus of claim 34, wherein the at least one restriction on storing electronic documents received includes allowing delivery of electronic documents that require less than a specified memory allocation size and suspending delivery of electronic documents that require greater than or equal storage compared with the specified memory allocation size.

* * * * *

UNITED STATES PATENT AND TRADEMARK OFFICE
CERTIFICATE OF CORRECTION

PATENT NO. : 6,972,875 B2  Page 1 of 1
APPLICATION NO. : 09/917014
DATED : December 6, 2005
INVENTOR(S) : Brewster It is certified that error appears in the above-identified patent and that said Letters Patent is hereby corrected as shown below:

Col. 7 (line 59), delete "selling" and insert therefor --setting--.

Signed and Sealed this

Eighth Day of August, 2006

JON W. DUDAS
*Director of the United States Patent and Trademark Office*